June 14, 1966  N. D. SMITH, JR  3,256,501
SEISMIC SURVEYING SYSTEM FOR WATER-COVERED AREAS
Filed June 6, 1960  6 Sheets-Sheet 1

INVENTOR
NOYES D. SMITH JR.
BY J. H. McCarthy
HIS AGENT

June 14, 1966  N. D. SMITH, JR  3,256,501
SEISMIC SURVEYING SYSTEM FOR WATER-COVERED AREAS
Filed June 6, 1960  6 Sheets-Sheet 2

INVENTOR
NOYES D. SMITH JR.
BY J. H. McCarthy
HIS AGENT

INVENTOR
NOYES D. SMITH JR.
BY *A. H. McCarthy*
HIS AGENT

June 14, 1966   N. D. SMITH, JR   3,256,501
SEISMIC SURVEYING SYSTEM FOR WATER-COVERED AREAS
Filed June 6, 1960   6 Sheets-Sheet 4

INVENTOR
NOYES D. SMITH JR.
BY A. H. McCarthy
HIS AGENT

RESPONSE OF ARRAY OF 5 RECEIVERS AS FUNCTION OF TIME.

RESULTANT SIGNAL PRODUCED BY ADDING TIME DELAYED SIGNALS.

$\Delta Z = \Delta L \sin \alpha$ $\Delta t = \dfrac{\Delta Z}{V_w}$ $\Delta t = \dfrac{L \sin \alpha}{(n-1)V_w}$ INVENTOR:
NOYES D. SMITH JR.
BY J. H. McCarthy
HIS AGENT United States Patent Office 3,256,501
Patented June 14, 1966

3,256,501
SEISMIC SURVEYING SYSTEM FOR WATER-COVERED AREAS
Noyes D. Smith, Jr., Bellaire, Tex., assignor to Shell Oil Company, New York, N.Y., a corporation of Delaware
Filed June 6, 1960, Ser. No. 34,028
24 Claims. (Cl. 340—7)

This invention relates to an apparatus and method of seismic prospecting for geological structures disposed beneath a body of water and pertains more particularly to a method and apparatus of imparting energy to a body of water and to the ground below it for seismic prospecting purposes wherein a substantially continuous line of explosive is detonated in a manner to control the direction of downward travel of maximum seismic energy.

One of the more commonly employed methods of surveying geological formations in water-covered areas is described in U.S. Patent 2,465,696 to L. R. C. Paslay. In this method, seismic signals are initiated from an explosive charge lowered into a body of water from a moving vessel and fired by control means from the vessel when the vessel has proceeded along a predetermined course for a distance sufficient to cause a flexible elongated streamer having a plurality of piezo-electric seismometers arranged at intervals therein to be positioned above or to one side of the explosion. The pressure applied to the seismometers by the surrounding water in response to seismic signals reflected from subsurface geological formations and tectonic structures in the earth beneath the explosion causes voltage signals to be generated by the seismometers corresponding respectively to the seismic signals received thereby. These electric signals are amplified and recorded on a moving tape or chart on the vessel in timed-spaced relation with respect to a start signal recorded thereon as the firing circuit for the initial explosion is closed, the exact geophysical location of the explosion being determined by signals received from a plurality of sono-buoys moored within the vicinity of the explosion, and recorded on the moving chart.

Various modifications of this method are employed. For example, some surveying parties tow the streamer or cable containing the seismometers below or to one side of the explosive charge. Additionally, in initiating seismic signals in water-covered areas, it is customary for safety reasons to employ a second vessel which plants the explosive charges over the center of the seismometer cable at a depth beneath the surface of the water where the gas bubble generated by the explosion can break through the surface of the water on its first expansion. The vessel towing the seismometer cable may also be provided with radio-location equipment or other means for determining the location of the vessel at any time. It has been found that it is necessary to tow the cable containing the linear array of seismometers at a critical depth in order to minimize the reception of unwanted seismic signals which are propagated in the water layer. Other systems are used in which explosives are suspended from a buoy which is floated behind a vessel, the explosives carried thereby being detonated when they have reached the center of the cable.

It is therefore a primary object of the present invention to provide a method and apparatus for use in seismic surveying work over water-covered areas whereby the use of charges of high explosives to generate a seismic signal may be eliminated, thus eliminating the use of dangerous explosives, precluding the possibility of killing fish and eliminating the use of a second boat to carry the explosives.

Another object of the present invention is to provide a method and apparatus for use in seismic surveying work over water-covered areas wherein an elongated sound source and an elongated sound detecting apparatus are towed by a boat at some predetermined position to each other at substantially the same preselected depth which may be greater than that normally chosen in order to eliminate the pulsations of a gas bubble formed by an explosive charge.

A further object of the present invention is to provide a seismic sound source for use in water-covered areas, said sound source having a substantially constant buoyancy.

A still further object of the present invention is to provide a sound source apparatus for use in seismic surveying over water-covered areas wherein most of the energy transmitted by the sound source is in frequencies of interest to seismic surveying.

Another object of the present invention is to provide a linear sound source system for use in seismic surveying over water-covered areas, said sound source having characteristics making it possible to attain a high signal-to-noise ratio.

It is also an object of the present invention to provide a method and apparatus for use in seismic surveying over water-covered areas wherein both the sound source and the receiver device are of a configuration adapted to minimize "singing" which frequently prevents the recording of useful seismic data in water-covered areas.

Another object of the present invention is to provide a method and apparatus for use in seismic surveying over water-covered areas wherein both the sound source and the seismometer cable can be located at a suitable water depth to minimize "singing."

Still another object of the present invention is to provide a linear sound source for use in seismic surveying operations, which sound source does not produce either the very high or low frequencies which are undesirable in seismic prospecting.

It is a further object of the present invention to provide a method for seismic surveying operations over water-covered areas where the use of high explosives as a sound source is prohibited by law.

Another object of the present invention is to provide a method for use in the seismic surveying work over water-covered areas wherein the underlying formations may possess a substantial angle of dip.

Another object of the present invention is to provide an apparatus for use in seismic surveying operations over water-covered areas where it is desired to change or control the angle of maximum directivity of a downwardly traveling seismic wave in order to study steeply dipping formations.

Still another object of the present invention is to provide a method for over-water seismic surveying work where it is desired to control the angle of maximum directivity of a downwardly traveling seismic wave while at the same time eliminating any possibility of a wave reflected from the surface of the water.

A still further object of the present invention is to provide an underwater seismic surveying sound source which has a directing and concentrating effect upon the energy that reaches a series of seismic detectors.

Further objects of the present invention will be understood from the following description taken with regard to the drawing wherein.

Figure 1:
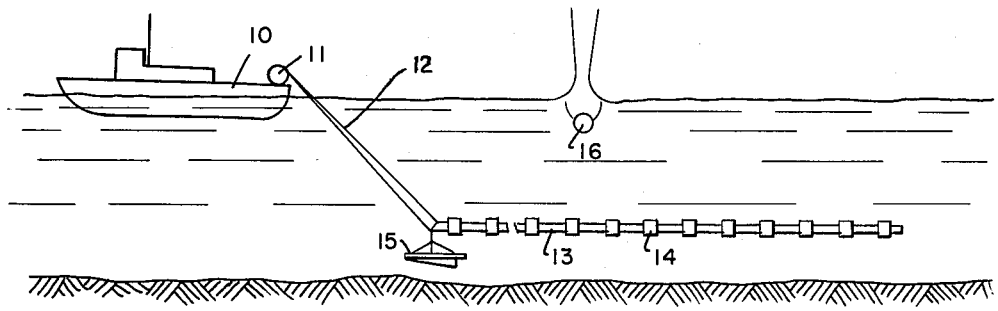
FIGURE 1 is a schematic view showing the relative positions of a towing vessel, seismometer spread, and explosive charge as commonly used in a presently known system.

As illustrated in FIGURE 1 of the drawing, the common method of carrying out seismic exploration work over water-covered areas is accomplished by means of a vessel 10 having a cable reel 11 mounted on the stern thereof for letting out or reeling in a lead-in or tow cable 12 to which is connected a detector streamer which comprises a flexible cable 13 having a plurality of seismometers or hydrophones 14 mounted therein or thereon in spaced relationship along the length of the cable 13. Any suitable type of weighting device 15 is secured to the leading end of the cable 13 so as to maintain it at a predetermined depth in the water. Normally the cable 13 has a neutral buoyancy so that it will stream out behind the weighting device 15 in a horizontal position at a constant depth in the water. The lead-in cable 12 contains the necessary electrical leads to connect the seismometer 14 to the recording equipment carried on board the vessel 10. The cable of seismometers 14 is towed a safe distance behind the vessel 10 so that a charge of high explosives 16 may be detonated when it is substantially opposite the midpoint of the cable 13. The explosive charge 16 is normally suspended in the water from a float and may be launched by either the recording vessel 10 or another vessel. It is customary to have the explosive charge positioned at a depth below the surface of the water so that the gas bubble generated by explosion breaks through the surface on its first expansion, as illustrated in FIGURE 1.

Figure 2:
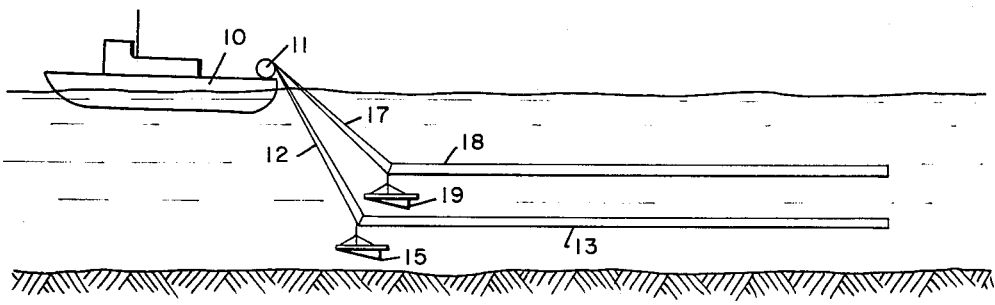
FIGURES 2 and 3 are schematic views of an over-water seismic surveying system in accordance with the present invention.

In accordance with the present invention, the use of a high explosive charge 16 (FIGURE 1) has been eliminated by providing an extended linear sound source to generate seismic waves in a body of water. In FIGURE 2, the vessel 10 is shown as being provided with one or more cable reels 11 from which a pair of towing cables 12 and 17 are pulled at an angle into the water by means of weighting devices 15 and 19. The detector streamer or seismometer cable 13 is similar to the one described hereinabove with regard to FIGURE 1 while the cable 18 secured to the towing cable 17 constitutes a source of seismic waves.

Figure 4:
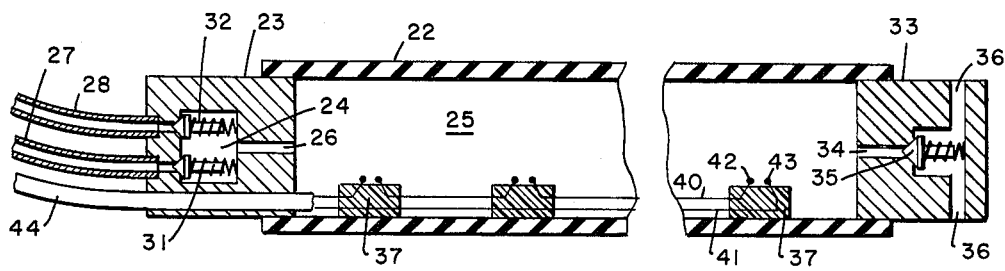
FIGURE 4 is a side view taken in longitudinal cross-section of a linear sound source in accordance with the present invention.

The linear sound source 18 is preferably in the form of a flexible hose or body member 22 (FIGURE 4) of small diameter, say, 1 to 6 inches. The body member may be made of any suitable plastic, rubber or rubber-like material of a thickness suitable to allow sound waves to be transmitted through the wall thereof. In order to strengthen the body member various types of materials such as thread, fabrics, or wire may be molded therein. The leading end of the body member 22 is closed by a plug 23 in which a mixing chamber 24 is formed. The mixing chamber 24 is in communication with the elongated chamber 25 within the body member 22 through a flow passage or choke 26. A pair of conduits 27 and 28 are in communication with the chamber 25. Unidirectional flow of gas through the conduits 27 and 28 is controlled by suitable valves, such as a pair of spring-loaded check valves 31 and 32 which are mounted in the plug 23.

The trailing end of the flexible body member 22 of the linear sound source may be left open at all times but is preferably closed by a plug 33 having a flow passage or choke 34 therein which is normally closed by means of a spring-loaded check valve 35. When open, the valve 35 permits gas to flow through choke 34 and thence outwardly through discharge ports 36.

The linear sound source of the present invention is provided with any suitable type of firing apparatus for igniting or detonating an explosive mixture of gas contained within the elongated chamber 25 of the body member 22. One form of firing mechanism is diagrammatically illustrated in FIGURE 4 as a plurality of plastic blocks 37 lying on the bottom of the flexible body member 22 at spaced intervals therealong. The plastic blocks 37 are interconnected electrically by means of lead wires 40 and 41. A pair of electrical contacts 42 and 43 on the top of each block 37 form a spark gap which is sufficient to ignite many explosive mixtures of combustible gases. The electrical leads 40 and 41 are suitably insulated and formed as a cable 44 which in turn may be wrapped together with gas conduits 27 and 28 to form the towing cable for the linear sound source. The electrical cable is connected to suitable circuits (not shown) on board the vessel 10 (FIGURE 2) for firing the gas in the body member 22. If desired, only a single pair of contacts 42 and 43 may form a spark gap at one end of the body member if it is desired to propagate the explosive wave along the length of the body member 22. Preferably, however, a plurality of the spark gaps is employed, say, one every foot or every five feet, in order to detonate all of the gas in the body member 22 substantially simultaneously. However, a much wider spacing of ignition points could be used if the detonating wave in the explosive mixture propagates uniformly. The maximum spacing depends on the highest frequency to be observed and is determined by the requirement that all of the gas be detonated within one-half period of this frequency. For example, if the maximum frequency to be observed is 100 cycles per second and the detonating velocity of explosive mixture is 2,000 meters per second, the spacing would be 20 meters.

In the operation of the present linear sound source, air and a combustible gas flow, or are pumped, from the vessel 10 (FIGURE 2) through conduits 27 and 28 (FIG- URE 4) in proportions desired, to form an explosive mixture when mixed together in the chamber 24 of the plug 23. The explosive mixture flows through choke 26 and fills the elongated chamber 25 within the body member 22. When it is desired to make a seismic record, current is passed through the electrical leads 40 and 41 to cause a spark to jump across the gaps formed by contacts 42 and 43, thus providing a plurality of spaced sparks which occur simultaneously along the length of the linear sound source. These sparks initiate an explosion of the gaseous mixture essentially simultaneously within the elongated chamber 25, and the seismic wave formed thereby is transmitted through the flexible walls of the body member 22 into the surrounding water. After the explosion has taken place within the elongated chamber 25, air may be blown through the chamber to clear the combustion products therefrom which will be forced out through the choke 34 and past check valve 35 so that the chamber is then ready to receive a new charge of explosive gaseous mixture. As an alternative, the combustion products may be forced out of the chamber 25 by a new charge of an explosive gaseous mixture so as to reduce the time required to displace the combustion products and fill the chamber 25 again with an explosive mixture. This latter method is especially good where it is desired to fire the sound source every few seconds.

The average buoyancy of a linear sound source 18 (FIGURE 2) would remain nearly constant since the chamber thereof would be filled at all times either with an explosive gaseous mixture or the combustion products thereof. The natural buoyancy of the linear sound source 18 would depend on the manner in which it was constructed and the manner in which the sound source was intended to be used. In one form, the seismic sound source of the present invention will be constructed to have a neutral buoyancy, that is, one which will tend to maintain the same position in the water when towed by a vessel so that it is strung out in back of a weighting device 19, as shown in FIGURE 2. However, in many applications of the present invention it is desired to employ a linear sound source of negative buoyancy so that, when towed at the end of a tow line 17 (FIGURE 2) the trailing end of the linear sound source 18 will be substantially lower in the water than the lead end and will maintain that position while towed at a constant speed. The angle formed between the surface of the water and the sloping linear sound source may be anywhere from zero to 75°, depending upon the type of signal it is desired to obtain. Adjustment of the buoyancy may be carried out by supplying weights to the linear sound source in a manner well known to the art, or heavy materials may be incorporated in the linear sound source during its construction. Alternatively, the linear sound source 18 could be provided with a series of floats either attached to it or provided therein, in a manner well known to the art to give the sound source greater buoyancy. Thus, when a linear sound source 18 of positive buoyancy was towed after the weighting device 19, the trailing end of the linear sound source would be substantially closer to the surface of the water than the lead end of the sound source.

The linear sound source 18 of the present invention may be towed by a vessel 10 in various positions relative to a seismometer cable 13. As illustrated in FIGURE 2, the linear sound source is shown as being towed parallel to and above a flexible seismometer 13. However, the linear sound source 18 could also be towed parallel to the seismometer cable 13 to one side thereof or below, as desired. Additionally, one or more seismometer cables may be towed adjacent a linear sound source 18, for example, with one seismometer cable on each side of the sound source or with one seismometer cable above and one below the sound source. It is further possible to employ a plurality of linear sound source cables 18 which are preferably towed at the same depth in the water but spaced from each other horizontally so as to cover a substantial area. A spread of linear sound sources of this type may be used with any particular type or arrangement of flexible seismometer cables.

Figure 3:
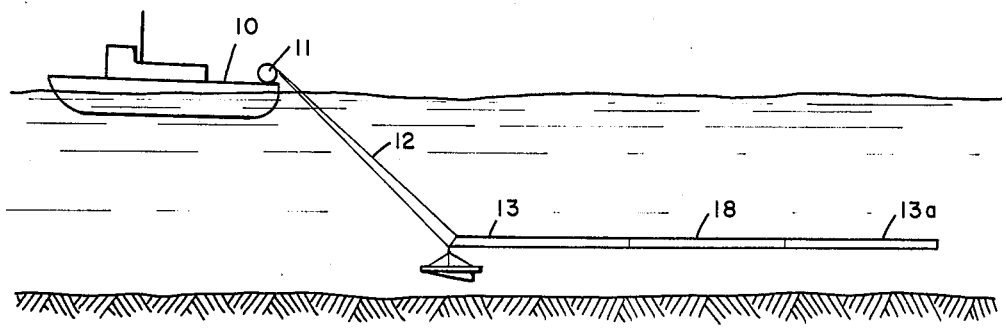

A particularly good arrangement of the present linear sound source with a pair of seismometer cables is illustrated in FIGURE 3 wherein the linear sound source is connected end-to-end with a pair of seismometer cables 13 and 13a which are towed in alignment by the vessel 10. In this form it is apparent that the seismometer cable 13 must be provided either inside or outside thereof with suitable gas conduit means and electrical leads for supplying gas to the linear sound source 18 and igniting the gas at any desired time interval. While the linear sound source of the present invention has been shown in FIGURE 4 as being provided with a pair of conduits 27 and 28 for supplying gases such as air and acetylene to the mixing chamber 24, it is quite apparent that an explosive mixture of gas may be formed on board ship and pumped or otherwise forced down a single conduit into the elongated chamber 25 of the linear sound source.

The seismic signal generated by the linear sound source of the present invention has many advantages over other sources of seismic signals. At the present time it is not possible to place a charge of high explosives at the proper depth to insure the best recording because of the necessity of eliminating the pulsations of the bubble of gas that is formed by such an explosive. The use of high explosives in essentially a point source causes the generation of very high pressures at high frequencies near the source in order to obtain sufficient pressure in the relatively low frequency band between 30 and 60 cycles which are important in seismic prospecting. Thus, with high explosives most of the energy is in high frequency bands. However, if a large spherical volume of explosive gas were used as a seismic sound source, most of the energy discharged by such a source would be in frequencies lower than the seismic frequency desired for seismic surveying operations.

Thus the linear sound source of the present invention is superior to other sources of seismic energy in that, because of its small diameter, it concentrates more of the energy of the explosive gas in frequency bands of interest to seismic prospecting. The large pressures at high frequencies are eliminated. By distributing the sound source in a linear arrangement, with the length of the linear sound source being up to several wavelengths at the frequencies it is desired to study, a large gain in signal-to-noise ratio is obtained. Thus, with the method of the present invention, both the linear sound source and the sound receiver or seismometer cable can be located at a suitable depth in the water to minimize "singing" which frequently prevents the recording of useful seismic data in water-covered areas. The length of the linear sound source prevents the excitation of certain types of this "singing." Additionally, marine life is not damaged by the linear sound source of the present invention. The linear sound source described with regard to FIGURE 4 would be reasonably safe, as compared with high explosives, since the explosive gas and air need not be combined in an explosive mixture until they were in the mixing chamber. This would allow use of a single vessel for both initiating and recording seismic signals whereas in general two boats are normally used for this work at the present time.

In order to take advantage of all of the possibilities of the linear sound source of the present invention, it is desirable to incorporate a depth sensing means in the cable to determine the depth of the cable below the surface of the water at a number of points along the length of the cable. Additionally, a servo-system is preferably incorporated in the cable so as to permit changing the buoyancy of the cable to maintain it at a specified depth.

Figure 5:
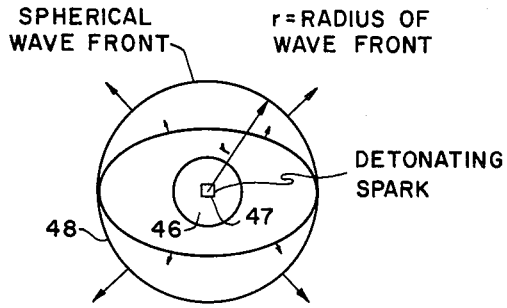
FIGURE 5 is a schematic view illustrating a spherical wave front expanding outwardly from a point source such as a detonating spark or explosive charge.

In order to consider more carefully the seismic wave principles involved in the method and apparatus of the present invention, reference is made to FIGURE 5 wherein a small spherical volume 46 of an explosive gas may be considered as being immersed in an infinite body of water assuming that a detonator spark 47 could be positioned and energized at the center of this volume of gas. Then, when the detonating wave from the exploding gas reaches the surface of the volume of the gas, a spherical compression wave would be propagated in the water. This wave is shown by the outwardly expanding line 48. This spherical compression wave has a uniform amplitude over its surface and the amplitude decreases proportional to the inverse of the radius of the spherical wave.

Figure 6:
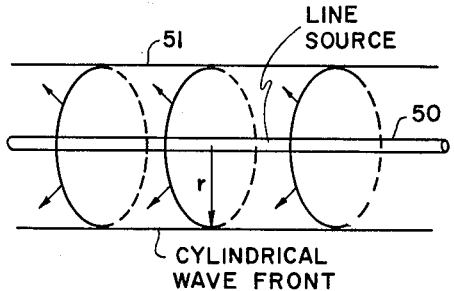
FIGURE 6 is a schematic view illustrating a cylindrical wave front expanding radially from an infinite line sound source immersed in an infinite fluid medium.
Figure 7:
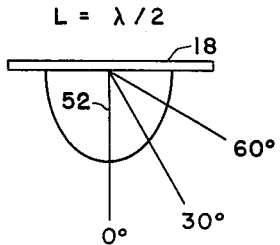
FIGURES 7, 8, 9 and 10 are directivity patterns of a seismic wave generated by a finite line sound source of length L which is assumed to be detonated simultaneously over its length.
Figure 8:
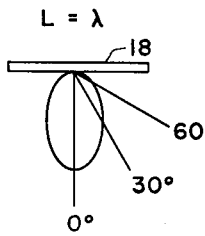

In FIGURE 6, a linear sound source 50 of infinite length is illustrated as being immersed in an infinite fluid medium such as water. If this linear sound source is detonated simultaneously along its length, then a cylindrical wave 51 would be generated that expanded radially outwardly. In this situation, the pressure amplitude of the expanding compressional wave is uniform over the cylindrical wave surface and there is a decrease in the amplitude inversely proportional to the square root of the radius as the generated cylindrical wave expands.

In the two cases described with regard to FIGURES 5 and 6, the geometry of the wave fronts and the manner in which they decrease in amplitude with distance would be independent of the wavelength of the elastic wave generated by these explosions.

In contrast to the above situations with regard to FIGURES 5 and 6, consideration is now given to a finite linear sound source of length L which is assumed to be detonated simultaneously over its length. The amplitude at a given wavelength λ in this case depends upon the angle that is formed between a line extending downwardly from the center of the linear source and a line connecting the center of the linear source to an observation point such as seismometer. This relationship is given by the expression $$R_\alpha \frac{\sin\left(\frac{\pi L}{\lambda} \sin \alpha\right)}{\frac{\pi L}{\lambda} \sin \alpha}$$

where $R_\alpha$ equals the ratio of pressure at $\alpha=0$ to that of $\alpha=\alpha$ measured at a distance large compared to the length L of the linear seismic source; $\alpha$=the angle formed by a line connecting the observation point and the center of the linear seismic source to a line normal through the center of the linear seismic source; L equals the length of the linear seismic source; and λ equals wavelength.

Figure 11:
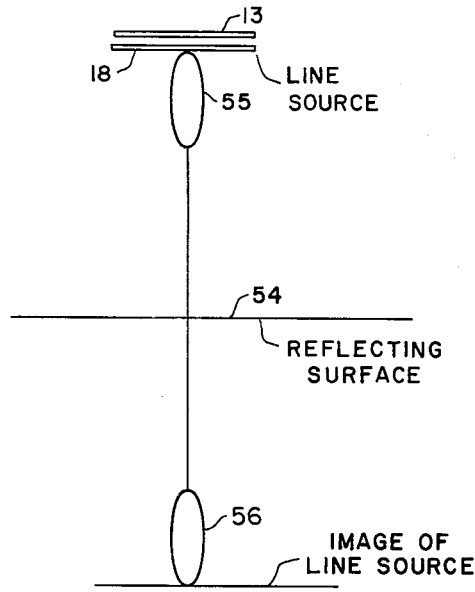
FIGURE 11 is a schematic view showing a directivity pattern of a line seismic source above a horizontal reflecting surface together with a directivity pattern of the image of the line source below the reflecting surface.

FIGURES 7, 8, 9 and 10 illustrate by means of directivity patterns the manner in which the amplitude varies with change in the angle from the line 52 normal to the linear source and an observation point taken at an angle between 0 and 90° to this line 52, when the length of the linear source L is taken at various ratios of a wavelength λ. From FIGURES 7 through 10, it may be seen that as the length of the linear seismic source of the present invention increases in length from one-half wavelength in FIGURE 7, to one wavelength in FIGURE 8, to four wavelengths in FIGURE 9, and to six wavelengths in FIGURE 10, the linear seismic source becomes more directive. From the directivity patterns of FIGURES 7 through 10 it may be seen that as the length of the linear seismic source increases, the principal direction of wave propagation is confined to a narrow area on each side of a line normal through the center of the elongated sound source.

Where seismic surveying operations are concerned with the mapping of substantially horizontal beds or formations, or those that dip at a small angle, a directive linear sound source according to the present invention improves the signal-to-noise ratio in a significant manner. In FIGURE 11, a seismometer cable 13 and a directive linear sound source 18 are illustrated as being positioned above a horizontal reflecting formation 54 which may be considered to be a considerable depth below the surface of the earth. The directivity pattern 55 is shown below the linear seismic source 18 while the image of the seismic source is shown as a directivity pattern 56 positioned below the reflecting formation 54. For an observation at the center of a hydrophone array such as the seismometer cable 13, the image has a maximum amplitude.

Figure 9:
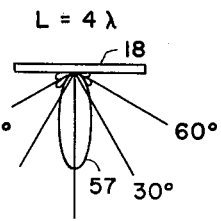
Figure 10:
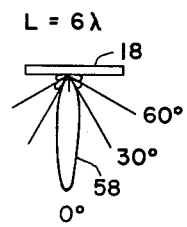
Figure 12:
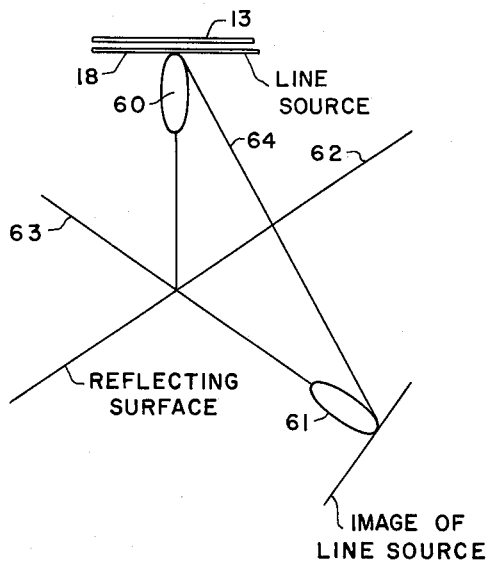
FIGURE 12 is a schematic view illustrating a directivity pattern of a line seismic source above a sharply dipping reflecting surface together with a directivity pattern of the image of the line source below the reflecting surface.

On the other hand, where the seismic surveying operations are concerned with mapping reflecting layers of earth formations which are steeply dipping with respect to the surface of the water, a linear seismic sound source of a length that would produce a highly directive pattern such as 57 and 58, of FIGURES 9 and 10, would produce no reflected signal or a much reduced signal for a seismometer cable 13 positioned adjacent the sound source arranged parallel to the surface of the water. This is illustrated in FIGURE 12 wherein the directivity pattern 60 of the linear sound source 18, and the image 61 of the linear sound source are shown on opposite sides of a steeply dipping reflecting subsurface formation 62. It will be seen that most of the energy from the linear seismic source 18 will be reflected from the formation layer 62 in the vicinity of line 63 and that only a small amount of the transmitted energy will be reflected along line 64 so as to be easily recognized by means of the seismometer cable 13. For an observation at the center of the seismometer cable 13, the intensity of the image is much reduced and may be zero.

From the above description of FIGURES 7 through 12 it may be seen that the most effective length of a linear seismic sound source constructed in accordance with the present invention depends upon the degree of dip to the reflecting formations being mapped. Referring again to FIGURES 7 through 10, it is seen that if the length of the seismic source was half a wavelength long of the particular frequency being studied, some directional gain is obtained but the directivity pattern also indicated that there is substantial energy transmission at all angles from 0 to 90° from line 52 which is normal to the linear source 18, as shown in FIGURE 7. Hence, a linear seismic source of about half a wavelength long would be very useful for studying rather a wide range of angles of dipping formations. If on the other hand the linear seismic source was, say, six wavelengths long, the signal therefrom would be very directive and only horizontal formations or formations having a very narrow range of dips close to the horizontal could be satisfactorily observed with the linear source positioned parallel to the surface of the water. However, for these horizontal or slightly dipping formations, a very high signal-to-noise ratio would be obtained when using a linear seismic source as compared to a point source, for example a charge of high explosives, radiating the same total power. For most practical cases of seismic exploration over water-covered areas, a linear seismic source two wavelengths long would be satisfactory to recognize dipping formations up to possibly 15°, since in this case the amplitude would only be cut by nearly half at a dip of 15°.

Figure 13:
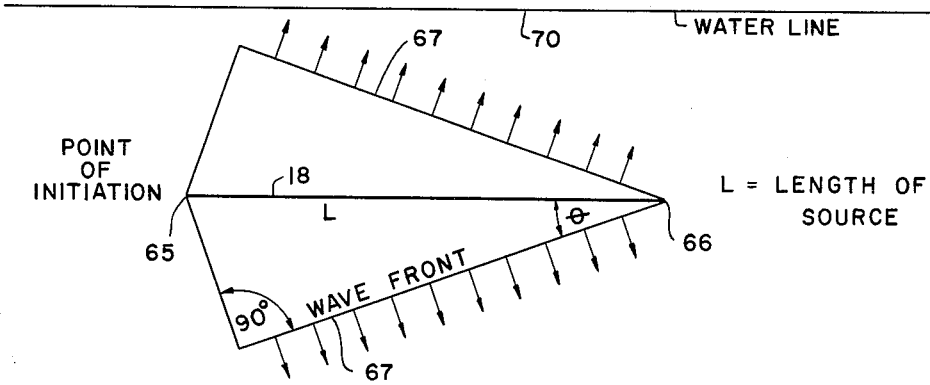
FIGURE 13 is a schematic view illustrating the cone-shaped wave front radiating from a linear seismic source which is detonated at one end with the detonation being propagated the length of the seismic source.

An important feature of the linear seismic source of the present invention is that it provides a seismic source whose angle of maximum directivity can be changed by the manner in which it is detonated. A linear seismic source 18 is illustrated in FIGURE 13 as having been detonated at end 65 with the detonation propagating with a velocity $V_d$ down the length of the source to end 66. The wave in the water surrounding the linear source is propagated at a velocity $V_w$ in the form of a cone 67 whose axis is the linear seismic source 18. The angle that the wave front makes with the linear source 18 may be given by the expression $$\sin \theta = \frac{V_w}{V_d}$$

The velocity of the detonation wave, $V_d$, in one suitable gas mixture detonated in a tubular linear seismic source in accordance with the present invention, may be in the order of 3000 meters per second. $V_w$ is approximately 1500 meters per second. Thus, sin $\theta$ equals 1500/3000 equals 0.500 and $\theta$ is 30°. This is one suitable angle at which the linear seismic source could be conveniently directed. Since it has been shown with regard to FIGURE 4 that the linear seismic source of the present invention may have a number of detonating points distributed at intervals along the length of the housing, which points can be detonated at any desired time interval either progressively or simultaneously, it may be seen that any angle between 0 and 30° can be obtained by varying the timing and the order of firing. In the case illustrated with regard to FIGURE 13, an approximately smooth wave front is obtained by employing a number of firing points which act as a number of small individual seismic sources arranged and aligned. In effect, the effective velocity of detonation is increased by employing multiple firing points along the linear source that are progressively fired. The lowest velocity of detonation is determined by the normal detonating velocity of any given explosive gas for the diameter of the linear source employed and the pressure conditions to which it is subjected. By firing in sequence at a number of points along the length of the linear source, it is possible to increase this detonation of velocity to infinity, that is, firing all of the spark gaps at one time.

If $V_d$ is considered the effective detonating velocity of a gas, the expression $$V_d = \frac{\Delta L}{\Delta t}$$

is obtained where $\Delta L$ is the spacing between the sparks in meters and $\Delta t$ is the time difference between the $n$th and the $(n+1)$th spark in seconds. Any one of a number of different circuits can be employed to provide the sequence of firing of various sparks and to vary the time interval between any of the sparks.

Figure 14:
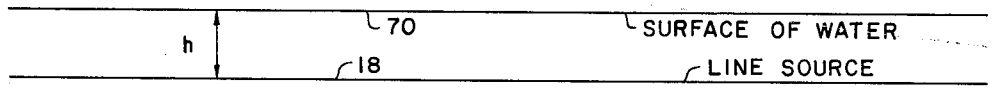
FIGURE 14 is a schematic view illustrating the optimum depth at which a linear seismic source in accordance with the present invention should be positioned in the water.
Figure 14:
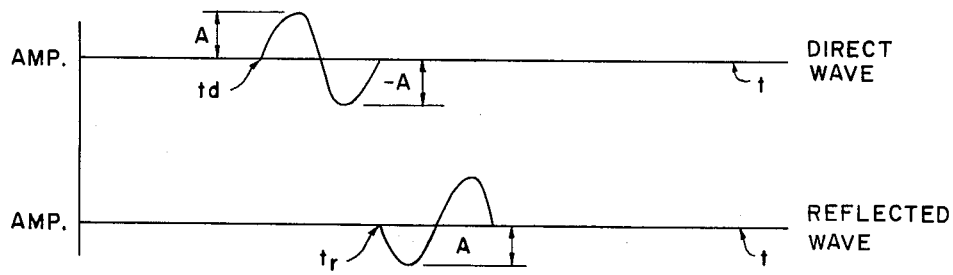
Figure 14:
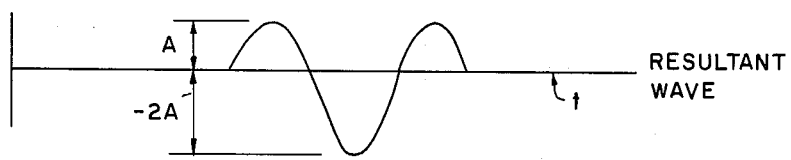

While the linear seismic source of the present invention may be operated at any depth of water, there is an optimum depth below the surface of the water at which the present linear seismic source generates the largest signal. At the top of FIGURE 14 the linear seismic source 18 of the present invention is shown positioned parallel to and at a depth $h$ below the surface of the water 70. For the purpose of this example it will be assumed that the elastic wave produced by this explosive linear source 18 is observed at a large distance below the source 18. In seismic surveying, the frequency content of the signal generated by an explosion covers a wide band, but it is customary, through use of transducers, amplifiers and filters, to restrict the observations to a fairly narrow band of frequencies. Thus, the direct wave, as viewed with any suitable apparatus well known to the art, may be approximately characterized as a signal of one wave length of the frequencies being observed. In the center of FIGURE 14, the amplitude of the direct wave and the wave reflected from the surface of the water have been plotted as functions of time. If $t_d$ be taken as the arrival time of the direct wave at the observation point and $t_r$ be taken as the arrival time of the wave reflected from the surface of the water, then $$t_r = t_d + \frac{2h}{V_w}$$

where $h_s$ is the depth of the source below the surface of the water and $V_w$ is the velocity of the elastic wave in water. If $h$ is large, the resultant signal observed will be two separate waves. The reflected wave is 180° out of phase with a direct wave because the surface of the water is a free surface. If we take $h$ equals 0, the resultant wave will be 0 since the interference will be destructive and complete. If $h$ is selected so that the first down swing of the reflected wave adds to the down swing of the direct wave, as shown in the bottom of FIGURE 14 the resultant wave has an additional swing but has its largest swing nearly twice the amplitude of the maximum amplitude of the separate waves. This preferred condition is reached when the reflected wave is delayed one-half period behind the direct wave. This condition may be expressed as $$\frac{2h}{V_w} = \frac{T}{2}$$

where T equals periods of wave. Solving for $h$, the expression obtained is $$h = \frac{V_w T}{4}$$

which expression may be written as $$h = \frac{\lambda}{4}, \text{ since } V_w T = \lambda$$

An important feature of the linear seismic source of the present invention is that it has been found that the seismic waves produced by an elongated column of gas in a flexible tube are not pulsating in character and thus the seismic source can be used at optimum depths which are normally deeper than those in which a charge of solid high explosive may be used. The linear seismic source of the present invention has been found to be especially useful in carrying out seismic surveying operations in areas where the problem of "singing" has been encountered. In presently known methods of seismic exploration, when a single charge of high explosive approximating a point source of seismic energy is used in marine seismic prospecting, a sustained oscillation is frequently observed due to waves traveling in the water layer and possibly in one or two solid layers near the liquid-solid interface at the ocean floor. The excitation of some of these oscillations depends on the spherical nature of the initial wave. If observations were to be made in line with, and at some distance from, the ends of a linear seismic source in accordance with the present invention, the recording instruments can be roughly considered to be at the axis of an expanding cylindrical wave front. This would be the arrangement as described with regard to FIGURE 3 with seismometer cables 13 and 13a on either end of a linear seismic source 18. The spherical wave front set up at each end of the linear seismic source are small in amplitude compared to the cylindrical wave front expanding radially away from the linear source. Consequently, the energy going out the ends of the linear source which is available for propagation as "singing" modes should be small compared to that available from a point source of equivalent strength. Hence, in areas where "singing" is encountered, the arrangement of the line source and seismometer cables of FIGURE 3 is preferred. However, in areas where there is no "singing" problem a parallel arrangement of the linear seismic source and seismometer cable can be employed. Additionally, the number of parallel linear seismic sources in accordance with this invention may be towed simultaneously to provide the equivalent of an area shot.

Figure 15:
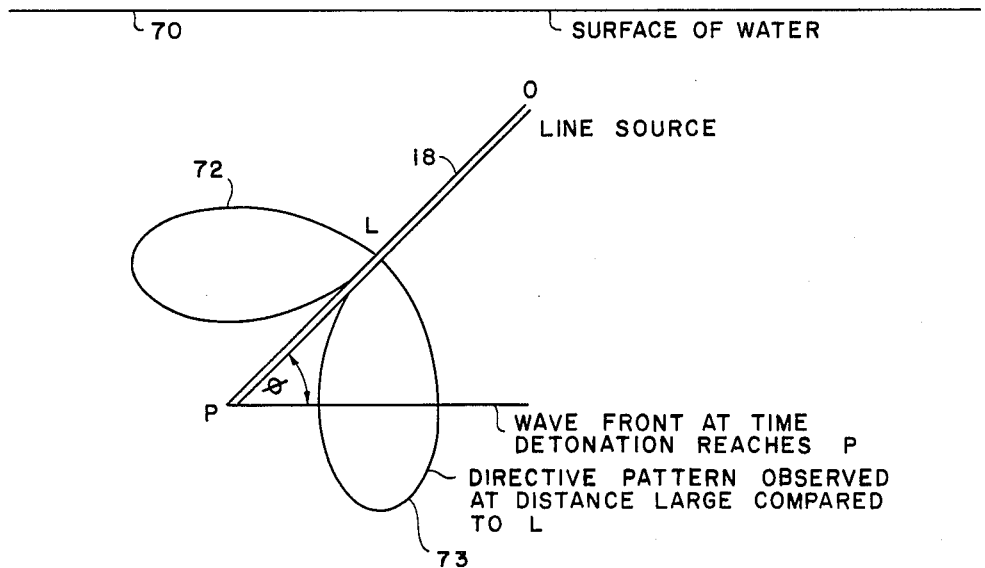
FIGURE 15 is a diagrammatic view illustrating the directivity pattern of a linear seismic source positioned at an angle within the water with detonation taking place at the high end of the line source.

The linear seismic source apparatus of the present invention is particularly useful in practicing a method of the present invention wherein the linear source is oriented in the water and detonation is initiated in the source in a manner such that the directive properties of the oriented line source eliminates or greatly minimizes the direct reflection from the surface of the water which is normally encountered in all seismic surveying operations over water-covered areas. This method is particularly important and easy to carry out in practice, especially when high frequency signals in the order of from one hundred to several hundred cycles per second are being used. In FIGURE 13 the directive properties of the linear seismic source of the present invention were illustrated with the one cone-shaped waves being transmitted from the linear source 18 at a 30° angle. In FIGURE 15, a linear seismic source of length L is shown beneath the surface of the water 70 inclined at a 45° angle to the surface. If the linear seismic source 18 is detonated at the end 0 which is closest to the surface of the water, the detonation travels along the linear source to point P with the velocity $V_d$. As previously described with regard to FIGURE 13, $$\sin \theta = \frac{V_w}{V_d}$$

where $\theta$ is the angle between the emitted wave front and the linear source.

If $\theta$ is chosen as 45°, then $$\frac{V_w}{V_d} = \frac{\sqrt{2}}{2}$$

Solving for $V_d$, it is found to be equal to $\sqrt{2}\ V_w$. If $V_w$ is equal to 1500 meters per second, then $$V_d = 1.41 \times 1500 = 2115 \text{ meters per second}$$

The velocity of detonation of mixtures of oxygen and acetylene in a slender cylinder in the form of the linear seismic source of the present invention can be varied from 2,000 to 3,000 meters per second depending upon the mixtures used. Mixtures of other explosive gases can be employed to give a range of velocities of detonation above and below the above limits. Thus, by use of the gaseous linear seismic source of the present invention it is possible to practice a method of seismic exploration wherein very little energy from the linear source is reflected from the surface of the water. This condition is illustrated in FIGURE 15 wherein directivity patterns 72 and 73 are shown emanating from opposite sides of the linear seismic source 18, when the seismic source 18 is viewed at a large distance compared to the length of the source. The directivity pattern 73 indicates the energy being transmitted vertically downward into the earth formations. The directivity pattern 72 which would normally be reflected from the surface of the water if the linear seismic source 18 was parallel to the surface of the water, is shown as being radiated or directed substantially horizontally to the surface of the water so that little energy from the linear source 18 is reflected from the surface.

Figure 16:
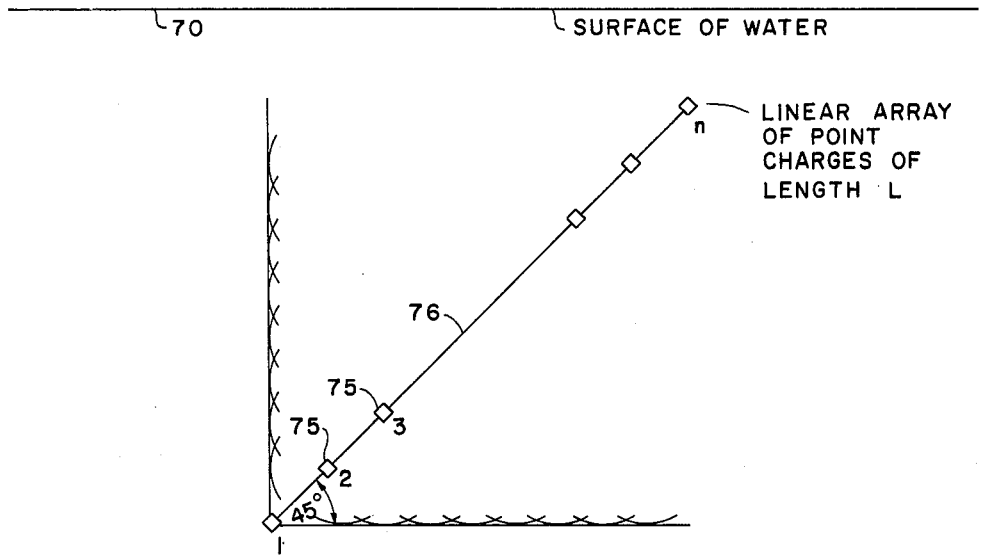
FIGURE 16 is a diagrammatic view similar to FIGURE 15 wherein a linear array of point charges along a line of length L is employed rather than a continuous linear seismic source.

Again, but with less convenience, the method of towing a seismic source in a manner so as to eliminate any direct reflections from the surface of the water may be accomplished by towing a plurality of individual point charges of high explosive on a cable 76 in a linear array at a predetermined angle beneath the surface of the water, as shwon in FIGURE 16. The point charges 75 are detonated in sequence with a proper time interval between detonations. The apparent detonation velocity equals $\Delta L/\Delta t$, which is desired to made equal to $\sqrt{2}\ V_w$.

$$\Delta t = \frac{\Delta L}{\sqrt{2} V_w}$$

If $n$ equals the number of charges, $$\Delta L = \frac{L}{n-1}$$

Then $$\Delta t = \frac{L}{(n-1)\sqrt{2} V_w}$$

Figure 17:
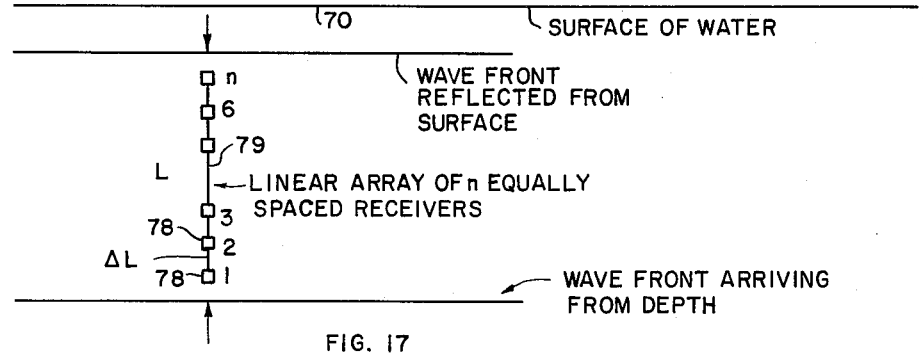
FIGURE 17 is a schematic view illustrating a linear array of equally spaced seismometers vertically positioned within the water.
Figure 18:
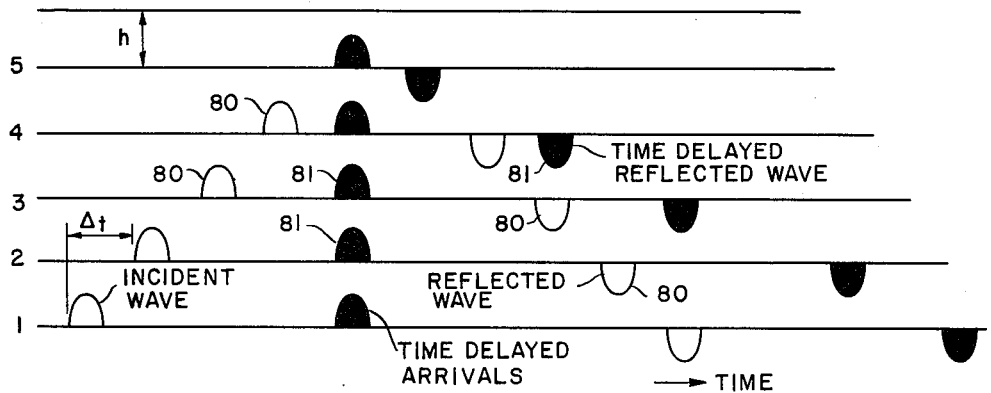
FIGURE 18 is a plot of the seismic waves received by the seismometers of FIGURE 17 and the reflected waves, together with time-delayed arrivals of the incident waves and the time-delayed reflected waves.

Consideration is now given to the problem of receiving seismic signals during operation in water-covered areas. In FIGURE 17, a vertical linear array of seismic detectors 78 are illustrated as being suspended on a cable 79 below the surface of the water 70. In FIGURE 18, a plot for five of the detectors 78 of FIGURE 17 illustrates the signals received by each seismic detector as a function of time for a wave coming vertically upward. If L is the length of the array and $n$ is the number of equally spaced seismic detectors in the array, then the interval between the detectors $\Delta L$ equals $L/(n-1)$. As a vertically traveling wave which has been reflected from a subsurface formation passes upwardly past the array of detectors, it arrives at each successively shallower detector with a delay $\Delta t$ equals $L/V_w$, where $V_w$ is the velocity of elastic waves in the water. After the wave has passed the array of detectors 78 (FIGURE 17) it is reflected from the surface of the water 70 and then proceeds downwardly, reversed in phase and once again delayed by the amount $\Delta t$. This pattern of arrivals of the wave at the successive seismic detectors is shown in FIGURE 18 by the ascending and descending open loops 80.

Figure 19:
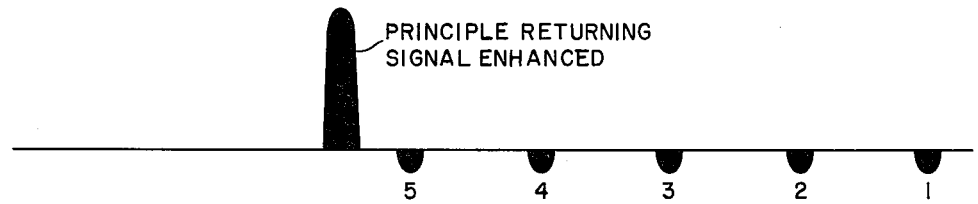
FIGURE 19 is a plot of the record obtained when the time-delayed signals from the arrangement of FIGURE 17 are added together; and, FIGURE 20 is a schematic view illustrating the seismometer spread of FIGURE 17 when inclined at an angle.

In accordance with the present invention any suitable time delay instrumental means well known to the art may be positioned in a circuit between the seismic detectors 18 and whatever recorder is being used to introduce varying time delays from each of the signals being transmitted by the detectors. These time delays are selected at varying values in a manner such that the successive arrivals of the vertically traveling wave appear on the recorder to arrive at the same time as shown by the filled-in loops 81 in FIGURE 18. When the vertically arriving wave is reflected from the surface of the water to move downwardly past the seismic detector 78 again the recorded time delayed reflected waves will appear further apart than the reflected waves 80. On making an addition on suitable equipment well known to the art of the data recorded in FIGURE 17, a record similar to that shown in FIGURE 19 is obtained where the incoming wave is multiplied in amplitude by the number of detectors and the wave reflected from the surface and moving downwardly is recorded with the original amplitude but is repeated in time depending upon the number of detectors employed. This type of recording and addition can be accomplished by various types of instruments such as electrical delay lines, acoustical delay lines, or be recorded in a reproducible record and re-recorded with suitable time delays, equipment and method well known to the art.

Figure 20:
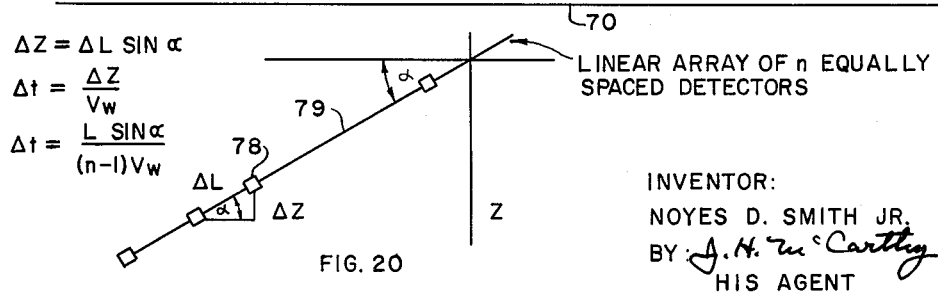

Since a spread of seismic detectors 78 arranged vertically as in FIGURE 17 would be seldom used, and since it would be very impractical to tow a vertical spread of detectors of any substantial length through the water, the linear array of seismic detectors would normally be towed through the water at an angle less than 90° with the surface, as shown in FIGURE 20. As described hereinabove with regard to FIGURE 17, $n$ equals the number of seismic detectors in the inclined array in FIGURE 20, L equals the length of the array, and $\alpha$ is the angle the linear array of detectors makes with the surface of the water. Let $\Delta z$ equal the vertical path between the equally spaced seismic detectors, then $$\Delta z = \Delta L \sin \alpha$$

$$\Delta t = \frac{\Delta z}{V_w} = \frac{\Delta L \cdot \sin \alpha}{V_w}$$

Since $\Delta L = L/(n-1)$, $$\Delta t = \frac{\Delta L \cdot \sin \alpha}{(n-1) V_w}$$

I claim as my invention:

1. For use in seismic prospecting for geological structures disposed beneath a body of water, apparatus forming a linear sound source for creating explosive energy along a substantially continuous line, said apparatus comprising a generally horizontally-disposed elongated flexible body member having an elongated chamber formed therein, said flexible body member being made of a sound-transmitting material and being of small diameter relative to its length, the length of said body member being from one-half to several times the length of the wavelength under study during the seismic prospecting, gas conduit means secured to the lead end of said body member in communication between said body member and a source of combustible gases, gas ignition means positioned within the interior of said elongated chamber, and discharge port means from said elongated chamber.

2. For use in seismic prospecting for geological structures disposed beneath a body of water, apparatus forming a linear sound source for creating explosive energy along a substantially continuous line, said apparatus comprising a generally horizontally-disposed elongated flexible body member having an elongated chamber formed therein, said flexible body member being made of a sound-transmitting material and being of small diameter relative to its length, the length of said body member being from one-half to several times the length of the wavelength under study during the seismic prospecting, a gas-mixing chamber formed in the lead end of said body member, gas conduit means secured to the lead end of said body member in communication between said gas-mixing chamber and a source of combustible gases under pressure, gas ignition means positioned within the interior of said elongated chamber, and discharge port means from said elongated chamber.

3. For use in seismic prospecting for geological structures disposed beneath a body of water, apparatus forming a linear sound source for creating explosive energy along a substantially continuous line, said apparatus comprising a generally horizontally-disposed elongated flexible body member having an elongated chamber formed therein, said flexible body member being made of a sound transmitting material and being of small diameter relative to its length, the length of said body member being from one-half to several times the length of the wavelength under study during the seismic prospecting, connector means at the lead end of said body member for securing a tow cable thereto, a gas-mixing chamber formed in the lead end of said body member, gas conduit means secured to the lead end of said body member in communication between said gas-mixing chamber and a source of combustible gases under pressure, gas-ignition means positioned at least at one end within the interior of said elongated chamber, and discharge port means from said elongated chamber near the trailing end of said body member.

4. For use in seismic prospecting for geological structures disposed beneath a body of water, apparatus forming a linear sound source for creating explosive energy along a substantially continuous line, said apparatus comprising a generally horizontally-disposed elongated flexible body member having an elongated chamber formed therein, said flexible body member being made of a sound-transmitting material and being of small diameter relative to its length, the length of said body member being from one-half to several times the length of the wavelength under study during the seismic prospecting, cable connector means at the lead end of said body member for securing a tow cable thereto, a gas-mixing chamber formed in the lead end of said body member, gas conduit means secured to the lead end of said body member in communication between said gas-mixing chamber and a source of combustible gases under pressure, a plurality of gas ignition means positioned at spaced intervals within the interior of said elongated chamber throughout the length thereof, discharge port means from said elongated chamber near the trailing end of said body member, and pressure-responsive spring-loaded valve means normally closing said discharge port means.

5. For use in seismic prospecting for geological structures disposed beneath a body of water, apparatus forming a linear sound source for creating explosive energy along a substantially continuous line, said apparatus comprising an elongated flexible body member having an elongated chamber formed therein throughout the length thereof, said flexible body member being made of a sound transmitting material and being of small diameter relative to its length, the length of said body member being from one-half to several times the length of the wavelength under study during the seismic prospecting, cable connector means at the lead end of said body member for securing a tow cable thereto, a gas-mixing chamber formed in the lead end of said body member, gas conduit means secured to the lead end of said body member in communication between said gas-mixing chamber and a source of combustible gases under pressure, first gas flow-restricting means in communication between said gas-mixing chamber and the elongated chamber in said body member, a plurality of spark coils and gaps forming ignition means positioned at spaced intervals within the interior of said elongated chamber throughout the length thereof, discharge port means from said elongated chamber near the trailing end of said body member, second gas flow-restricting means in said chamber upstream of said discharge port means, and pressure-responsive spring-loaded valve means normally closing said discharge port means.

6. A method of seismic surveying over a water-covered area, said method including the steps of towing an elongated substantially linear sound source streamer through the water at an angle to the surface thereof with one end being higher in the water than the other end, and causing a detonation to take place in the towed linear sound source streamer throughout the length thereof to form a wave front radiating from said streamer.

7. A method of seismic surveying over a water-covered area to eliminate reverberations in the nature of seismic waves within the water layer that are normally reflected downwardly from the surface of the water, said method including the steps of towing an elongated substantially linear sound source streamer through the water at an angle to the surface thereof with one end being higher in the water than the other end, initiating a detonation at the high end of the towed linear sound source streamer which detonation is propagated at a known velocity throughout the length thereof to form a substantially cone-shaped wave front radiating from said streamer.

8. A method of seismic surveying over a water-covered area to eliminate reverberations in the nature of seismic waves within the water layer that are normally reflected downwardly from the surface of the water, said method including the steps of towing an elongated substantially linear sound source streamer through the water at an angle to the surface thereof with one end being higher in the water than the other end, initiating a detonation at the high end of the towed linear sound source streamer which detonation is propagated at a known velocity throughout the length thereof to form a substantially cone-shaped wave front radiating from said streamer, the angle of the streamer in the water and the rate of propagation of said detonation along said streamer being selected so that no direct wave from the linear sound source streamer reflects from the surface of the water in the vicinity of said sound source.

9. A method of seismic surveying over a water-covered area to eliminate reverberations in the nature of seismic waves within the water layer that are normally reflected downwardly from the surface of the water, said method including the steps of towing an elongated substantially linear sound source streamer through the water at an angle to the surface thereof with one end being higher in the water than the other end, initiating a detonation at the high end of the towed linear sound source streamer which detonation is propagated at a known velocity throughout the length thereof to form a substantially cone-shaped wave front radiating from said streamer which lies along the longitudinal axis thereof, the streamer in the water forming an angle of from about 30 degrees to about 60 degrees with the horizontal, and the rate of propagation of said detonation along said streamer being selected so that no direct wave from the streamer reflects from the surface of the water in the vicinity of said streamer.

10. A method of seismic surveying over a water-covered area to eliminate reverberations in the nature of seismic waves within the water layer that are normally reflected downwardly from the surface of the water, said method including the steps of towing an elongated substantially linear sound source streamer through the water at an angle to the surface thereof with one end being higher in the water than the other end, initiating a series of timed detonations starting at the high end of the towed linear sound source streamer which detonations progress at a known rate throughout the length thereof to form a substantially cone-shaped wave front radiating from said streamer, the angle of the streamer in the water and the rate of propagation of said detonations along said streamer being selected so that one side of the cone-shaped wave front is substantially normal to the surface of the water and does not reflect therefrom.

11. A method of seismic surveying over a water-covered area to eliminate reverberations in the nature of seismic waves within the water layer that are normally reflected downwardly from the surface of the water, said method including the steps of towing an elongated substantially linear sound source streamer through the water at an angle to the surface thereof with one end being higher in the water than the other end, said sound source streamer comprising a linear array of a plurality of individual explosive charges spaced at intervals along a towing cable, initiating a detonation at the high end of the linear sound source stream which detonation is propagated at a known velocity throughout the length thereof to form a substantially cone-shaped wave front radiating from said streamer, the angle of the streamer in the water and the rate of propagation of said detonation along said streamer being selected so that one side of the cone-shaped wave front is substantially normal to the surface of the water and does not reflect therefrom.

12. A method of seismic surveying over a water-covered area to eliminate reverberations in the nature of seismic waves within the water layer that are normally reflected downwardly from the surface of the water, said method including the steps of towing an elongated gas-filled linear sound source streamer through the water at an angle to the surface thereof with one end being higher in the water than the other end, initiating a detonation at the high end of the towed linear sound source streamer which detonation is propagated at a known velocity throughout the length thereof to form a substantially cone-shaped wave front radiating from said streamer, the angle of the streamer in the water and the rate of propagation of said detonation along said streamer being selected so that one side of the cone-shaped wave front is substantially normal to the surface of the water and does not reflect therefrom, continually pumping and detonating additional charges of an explosive gas in said linear sound source streamer, and selectively varying the composition of said explosive gas to change the rate of propagation of said detonation.

13. A method of seismic surveying over a water-covered area to eliminate reverberations in the nature of seismic waves within the water layer that are normally reflected downwardly from the surface of the water, said method including the steps of towing from a vessel an elongated substantially linear sound source streamer through the water at an angle to the surface thereof with one end being higher in the water than the other end, initiating a detonation at the high end of the towed linear sound source streamer which detonation is propagated at a known velocity throughout the length thereof to form a substantially cone-shaped wave front radiating from said streamer, the angle of the streamer in the water and the rate of propagation of said detonation along said streamer being selected so that no direct wave from the sound source streamer reflects from the surface of the water in the vicinity of a plurality of seismometers, and simultaneously towing along substantially the same course a plurality of seismometers within a second flexible streamer.

14. A method of seismic surveying over a water-covered area to eliminate reverberations in the nature of seismic waves within the water layer that are normally reflected downwardly from the surface of the water, said method including the steps of towing from a vessel an elongated substantially linear sound source streamer through the water at an angle to the surface thereof with one end being higher in the water than the other end, initiating a detonation at the high end of the towed linear sound source streamer which detonation is propagated at a known velocity throughout the length thereof to form a substantially cone-shaped wave front radiating from said streamer, the angle of the streamer in the water and the rate of propagation of said detonation along said streamer being selected so that one side of the cone-shaped wave front is substantially normal to the surface of the water and does not reflect therefrom, and simultaneously towing along substantially the same course but closer to the towing vessel a plurality of pressure-responsive devices within a second flexible streamer, said second flexible streamer being towed above said sound source streamer in a substantially horizontal position at a predetermined depth in the water.

15. A method of seismic surveying over a water-covered area to eliminate reverberations in the nature of seismic waves within the water layer that are normally reflected downwardly from the surface of the water, said method including the steps of towing from a vessel an elongated substantially linear sound source streamer through the water at an angle to the surface thereof with one end being higher in the water than the other end, initiating a detonation at the high end of the towed linear sound source streamer which detonation is propagated at a known velocity throughout the length thereof to form a substantially cone-shaped wave front radiating from said streamer, the angle of the streamer in the water and the rate of propagation of said detonation along said streamer being selected so that one side of the cone-shaped wave front is substantially normal to the surface of the water and does not reflect therefrom, and simultaneously towing along substantially the same course but closer to the towing vessel a plurality of seismometers within a second flexible streamer, said second flexible streamer being towed above said sound source streamer in a substantially horizontal position at a predetermined depth and angle to one side thereof.

16. A method of seismic surveying over a water-covered area to study dipping formations having an average dipping angle, said method including the steps of towing from a vessel an elongated substantially linear sound source streamer through the water at the average angle of the dipping formations thereof, and initiating a detonation simultaneously at a plurality of points along the length of the towed linear sound source streamer to generate an elongated cylindrical wave having maximum directivity of energy in a line substantially normal to the average dipping formation.

17. A method of seismic surveying over a water-covered area to study dipping formations having an average dipping angle, said method including the steps of towing from a vessel an elongated substantially linear sound source streamer through the water at the average angle of the dipping formations thereof, and initiating a detonation simultaneously at a plurality of points along the length of the towed linear sound source streamer to generate an elongated cylindrical wave having maximum directivity of energy in a line substantially normal to the average angle of the dipping formations, and simultaneously towing along substantially the same course a plurality of seismometers within a second flexible streamer.

18. A method of seismic surveying over a water-covered area to study underlying formations which slope or dip at varying angles over a laterally-extensive area to be surveyed, said method including the steps of towing from a vessel an elongated substantially linear sound source streamer through the water at the average angle of the dipping formations thereof, and initiating a detonation simultaneously at a plurality of points along the length of the towed linear sound source streamer to generate an elongated cylindrical wave having maximum directivity of energy in a line substantially normal to the average dipping formation, and simultaneously towing along substantially the same course a plurality of seismometers within a second flexible streamer, said second flexible streamer being towed above said sound source streamer in a substantially horizontal position at a predetermined depth, and recording the seismometer signals in phased time-delayed sequence so that the first direct wave reflected from a formation has an amplitude substantially greater than subsequent time-delayed reflected waves.

19. A method of seismic surveying over a water-covered area to study underlying formations which slope or dip at varying angles over a laterally-extensive area to be surveyed, said method including the steps of towing from a vessel an elongated substantially linear sound source streamer through the water at the average angle of the dipping formations thereof, and initiating a detonation simultaneously at a plurality of points along the length of the towed linear sound source streamer to generate an elongated cylindrical wave having maximum directivity of energy in a line substantially normal to the average dipping formation, and simultaneously towing along substantially the same course a plurality of seismometers within a second flexible streamer, said second flexible streamer being towed substantially parallel to and substantially at the same angle of the first flexible streamer.

20. The method of seismic prospecting for geological structures disposed beneath a body of water, said method comprising the steps of towing a plurality of pressure-responsive devices within a flexible streamer by a vessel along the course thereof with said pressure-responsive devices being maintained at a predetermined depth and at an angle to the surface of the water, simultaneously towing along a parallel course at a predetermined depth parallel to the surface of the water a second flexible streamer having sound source means contained therein, repeatedly firing said sound source means to produce a series of elongated cylindrical pressure waves having one component thereof directed downwardly into the formations beneath the water, receiving seismic signals transmitted to said pressure responsive devices through the surrounding water in the form of pressure pulses corresponding to reflections of the originally produced cylindrical pressure waves, and recording said seismic signals corresponding to said pressure pulses.

21. The method of seismic prospecting for geological structures disposed beneath a body of water, said method comprising the steps of towing a plurality of pressure-responsive devices within a flexible streamer by a vessel along the course thereof with said pressure-responsive devices being maintained at a predetermined depth and at an angle to the surface of the water, simultaneously towing along a parallel course at a predetermined depth parallel to the surface of the water a second flexible streamer having sound source means contained therein, repeatedly firing said sound source means to produce a series of elongated cylindrical pressure waves having one component thereof directed downwardly into the formations beneath the water, receiving seismic signals transmitted to said pressure responsive devices through the surrounding water in the form of pressure pulses corresponding to reflections of the originally produced cylindrical pressure waves, and recording said seismic signals corresponding to said pressure pulses in a phased time-delayed sequence so that the signals representing the first direct wave reflected from a formation under study are recorded simultaneously to yield a wave form having an amplitude substantially greater than subsequent time-delayed reflected waves.

22. In seismic prospecting for geological structures disposed beneath a body of water, a method of creating explosive energy along a substantially continuous line, said method comprising the steps of
confining a volume of explosive gas in an elongated form,
disposing said confined gas linear in shape volume substantially horizontally within a body of water at a predetermined depth, said gas extending continuously along a line of a length from about one-half to several wave lengths of the seismic frequencies being studied,
moving said confined elongated volume of gas to a predetermined position within said body of water, and
igniting said confined gas volume and generating a wave front radiating in all directions from said horizontally disposed gas volume.

23. The method of claim 22 in which the ignition step is carried out at a plurality of points along the length of said gas volume to generate an elongated cylindrical wave front radiating in all directions from said horizontally disposed gas volume.

24. The method of claim 22 in which the ignition step is carried out at one end of said confined gas volume causing an explosion to be propagated the length thereof to generate an elongated cone-shaped wave front radiating from the position of said elongated horizontally-disposed gas volume.

References Cited by the Examiner

UNITED STATES PATENTS

| | | | |
|---|---|---|---|
| 1,500,243 | 7/1924 | Hammond | 340—12 |
| 2,164,858 | 7/1939 | West | 340—12 |
| 2,440,903 | 5/1948 | Massa | 181—0.5 |
| 2,627,930 | 2/1953 | Woods | 181—0.5 |
| 2,638,176 | 5/1953 | Doolittle | 181—.5 X |
| 2,679,205 | 5/1954 | Piety | 181—0.5 |
| 2,706,011 | 4/1955 | Bayhi | 181—0.5 |
| 2,724,452 | 11/1955 | Sorge | 181—0.5 |
| 2,894,596 | 7/1959 | Flatow et al. | 181—0.5 |
| 3,022,852 | 2/1962 | Pavey | 340—12 X |

BENJAMIN A. BORCHELT, *Primary Examiner.*

CHARLES W. ROBINSON, CHESTER L. JUSTUS, SAMUEL FEINBERG, *Examiners.*

S. J. TOMSKY, A. E. HALL, J. W. MILLS, R. M. SKOLNIK, *Assistant Examiners.*